(12) United States Patent
You et al.

(10) Patent No.: US 8,713,164 B2
(45) Date of Patent: *Apr. 29, 2014

(54) FEEDBACK METHOD AND PROCESSING SYSTEM FOR POLICY INSTALLATION FAILURES

(75) Inventors: Jianjie You, Shenzhen (CN); Tong Rui, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 328 days.

This patent is subject to a terminal disclaimer.

(21) Appl. No.: 13/056,776

(22) PCT Filed: Dec. 18, 2008

(86) PCT No.: PCT/CN2008/073578
§ 371 (c)(1),
(2), (4) Date: Jan. 31, 2011

(87) PCT Pub. No.: WO2010/020102
PCT Pub. Date: Feb. 25, 2010

(65) Prior Publication Data
US 2011/0138237 A1    Jun. 9, 2011

(30) Foreign Application Priority Data
Aug. 20, 2008 (CN) .......................... 2008 1 0147531

(51) Int. Cl.
*G06F 15/173* (2006.01)
*H04L 12/24* (2006.01)
*G06F 11/00* (2006.01)

(52) U.S. Cl.
CPC .......... *H04L 41/069* (2013.01); *H04L 41/0806* (2013.01); *H04L 41/0869* (2013.01); *G06F 15/173* (2013.01); *G06F 11/00* (2013.01)
USPC ........................................................ 709/224

(58) Field of Classification Search
CPC .............. H04L 41/069; H04L 41/0806; H04L 41/0869; H04L 47/10; H04L 47/14; H04L 47/20; G06F 15/173; G06F 11/00
USPC ......... 709/201–202, 206, 226, 229, 231, 224; 726/1, 3; 370/468, 295.2, 395.21
See application file for complete search history.

(56) References Cited

U.S. PATENT DOCUMENTS 6,983,317 B1 * 1/2006 Bishop et al. ................. 709/223
(Continued)

FOREIGN PATENT DOCUMENTS

CN        1852537 A     10/2006
(Continued)

OTHER PUBLICATIONS

3GPP TS 29.212 v0.4.0 (Sep. 2006)—Policy and Charging Control over Gx reference point (Release 7).*
XP014056771—ETSI TS 183 060 v0.3.1 (Nov. 2007)—Telecommunications and Internet Converged Services and Protocols for Advanced Networking (TISPAN); Resource and Admission Control Subsystem (RACS); Re interface based on the DIAMETER protocol.*

(Continued)

*Primary Examiner* — Andrew Chriss
*Assistant Examiner* — Rasha Fayed
(74) *Attorney, Agent, or Firm* — Hunton & Williams, LLP

(57) ABSTRACT

A feedback method and a processing system for policy installation failures are applied in communication technical field, which is favorable for an Access Resource Admission Control Function (A-RACF) to accurately grasp the detailed information of policy installation failure enforced by the Resource Control Enforcement Function (RCEF), therefore the efficiency of downwardly sending the policies for installation next time is improved. The method includes: when the installation of the policies downwardly sent from the A-RACF to the RCEF is failed, the RCEF generates a feedback message to be sent to the A-RACF, wherein the feedback message includes error reasons of the policy installation failures.

11 Claims, 4 Drawing Sheets

(56) References Cited

U.S. PATENT DOCUMENTS

| | | | |
|---|---|---|---|
| 7,155,514 B1* | 12/2006 | Milford | 709/225 |
| 7,496,652 B2* | 2/2009 | Pezzutti | 709/223 |
| 7,647,398 B1* | 1/2010 | Fan | 709/224 |
| 8,059,533 B2* | 11/2011 | Andreasen et al. | 370/230 |
| 2004/0010586 A1* | 1/2004 | Burton et al. | 709/224 |
| 2004/0015579 A1* | 1/2004 | Cooper et al. | 709/223 |
| 2004/0034794 A1* | 2/2004 | Mayer et al. | 713/200 |
| 2004/0225749 A1 | 11/2004 | Pavlik et al. | |
| 2005/0240670 A1* | 10/2005 | Cheng | 709/227 |
| 2006/0041660 A1* | 2/2006 | Bishop et al. | 709/224 |
| 2008/0098228 A1 | 4/2008 | Anderson | |
| 2008/0177994 A1* | 7/2008 | Mayer | 713/2 |
| 2011/0138235 A1 | 6/2011 | You et al. | |

FOREIGN PATENT DOCUMENTS

| | | |
|---|---|---|
| CN | 1863201 A | 11/2006 |
| CN | 101198165 | 6/2008 |
| EP | 2296312 A1 | 3/2011 |

OTHER PUBLICATIONS

Mainwaring ("Next Generation Network QoS Control Architectures and Protocols", ITU-T Workshop "NGN and its Transport Networks" Kobe, Apr. 20-21, 2006).*
X.S0013-014-0 (X.S0013-014-0 (TIA 873.014) "All-IP Core Network Multimedia Domain" Service Based Bearer Control—Ty Interface Stage 3, version 1.0, Dec. 2007).*
3GPP TS 29.212 v0.4.0 (Sep. 2006) "Policy and Charging Control over Gx reference point" (Release 7).*
Telecommunications and Internet converged Services and Protocols for Advanced Networking(TISPAN); Resource and Admission Control Sub-system(RACS);Functional Architecture (2006).
International Search Report for International Application No. PCT/CN2008/073578, mailed Apr. 2, 2009.
English Translation of the Written Opinion of the International Search Authority in international application No. PCT/CN2008/073578, mailed on Apr. 2, 2009.

* cited by examiner

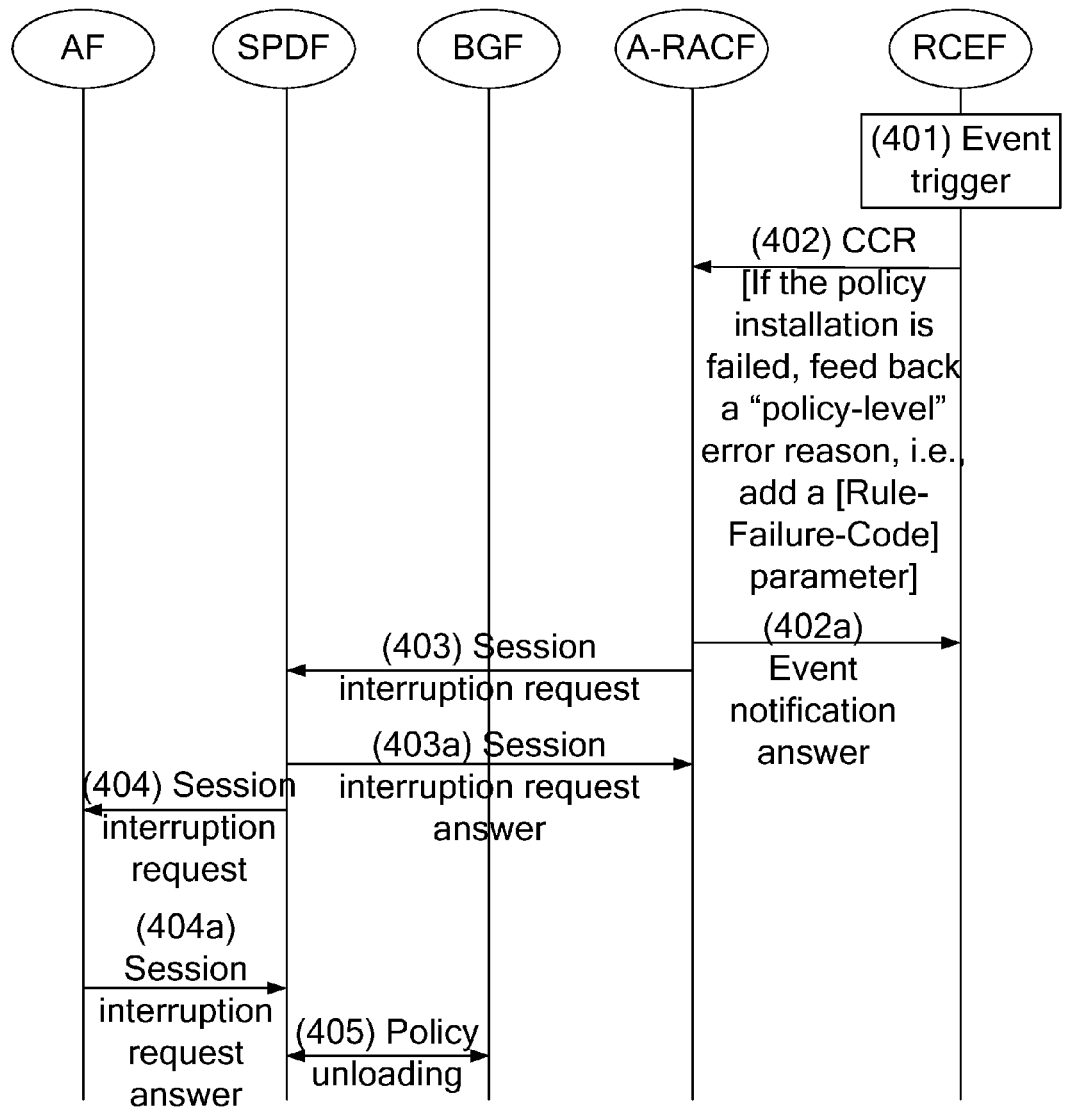

FEEDBACK METHOD AND PROCESSING SYSTEM FOR POLICY INSTALLATION FAILURES

CROSS-REFERENCE TO RELATED APPLICATIONS

This patent application is a U.S. national phase application of International Patent Application No. PCT/CN2008/073578, filed Dec. 18, 2008, which claims priority to China Patent Application No. 200810147531.8, filed Aug. 20, 2008, each of which is hereby incorporated by reference herein in its entirety.

TECHNICAL FIELD

The present disclosure relates to the technical field of communications, in particular to a processing method and system for policy installation failures.

BACKGROUND

NGN (Next Generation Network) is a hot research subject in the current communication standard field, adopting a packet technology, e.g. an IP technology, as a bearer network technology to make fixed communications and mobile communications converged.

Since a bearer network in an NGN adopts a packet technology, especially an IP technology, the QoS (Quality of Service) problem of the NGN becomes especially outstanding. Therefore, how to provide end-to-end QoS becomes one of the core issues of the NGN.

TISPAN (Telecommunication and Internet converged Services and Protocols for Advanced Networking) has established a specialized research group to work out NGN technical standards.

The TISPAN divides the NGN architecture into a service layer and a transport layer. An NASS (Network Attachment Subsystem) and an RACS (Resource and Admission Control Subsystem) are introduced into the transport control layer, wherein the NASS is responsible for providing independent user access management for the upper service layer and the RACS is responsible for solving the QoS problem of an NGN bearer network.

FIG. 1 illustrates a functional framework of an RACS in TISPAN in the prior art. As a part of an NGN, the RACS correlates the resource demand of a service layer (e.g. an IMS) with the resource allocation of a network bearing layer and mainly implements functions such as policy control, resource reservation, admission control and NAT (Network Address Translation) traversal, etc. The RACS provides transport-layer control service for AF (Application Function) via a series of QoS policies, so that a UE (User Equipment) can obtain required services with guaranteed QoS.

The RACS consists of two entities: an SPDF (Service-based Policy Decision Function) module and an A-RACF (Access-Resource and Admission Control Function) module, wherein the SPDF module provides a unified interface for the AF, shields the topology of the bottom network and specific access modes, and provides service-based policy control; the SPDF module chooses a local policy according to a request from the AF module, maps the request into a QoS parameter and transmits the QoS parameter to the A-RACF module and a BGF (Border Gateway Function) module to control corresponding resources;

the A-RACF module controls an access network and is provided with functions of admission control and network policy aggregation; the A-RACF receives a request from the SPDF module and realizes admission control based on access network policies, and then accepts or rejects the request for resource transmission; the A-RACF module obtains network attachment information and user QoS list information from the NASS via an e4 interface so as to determine available network resources according to network location information (e.g. the physical node address of an access user), and checks whether requested band width information is consistent with what is described in a user access list while processing a resource allocation request.

The transport layer comprises two functional entities: a BGF (Border Gateway Function) module and an RCEF (Resource Control Enforcement Function) module, wherein the BGF module is a packet-to-packet gateway, which can be located either between an access network and a core network (to realize a core border gateway function) or between two core networks (to realize an interconnection border gateway function); under the control of the SPDF module, the BGF module completes functions including NAT traversal, gate control, QoS marking, band width limitation, usage measurement and resource synchronization;

the RCEF module carries out an L2/L3 (layer 2/layer 3) media stream policy transferred via an Re reference point from the A-RACE module to complete functions such as gate control, QoS marking, band width limitation, etc.

FIG. 2 illustrates a resource request process in PUSH mode in the prior art. The flowchart includes the following steps:

(201) AF receives a service request from a user, and is triggered to generate a session initialization request;

(202) the AF sends a service request message to SPDF to request for resources to meet the user demand;

(203) the SPDF performs an authorization check on the service request according to policies of local operators, i.e., determining whether the requested resources are consistent with the policy rules of the local operators;

(204) if the authorization check is passed, the SPDF sends a resource request message to A-RACF to request corresponding resources;

(205) the A-RACF performs authorization and admission control according to access network policies, and determines whether it is necessary to load a transmission policy into RCEF;

(206) if the loading is required, the A-RACF interacts with the RCEF and performs transmission policy installation (also named as policy loading);

(207) the RCEF sends a policy install answer message to the A-RACF to confirm the installation;

(208) the A-RACF sends a resource request answer to inform the SPDF;

(209) the SPDF sends a policy to the BGF, and the BGF performs installation and informs the SPDF of the result;

step (209) and steps (204)-(208) are not necessarily performed in sequence and may also be performed simultaneously; and (210) the SPDF sends a service request answer to inform the AF.

In step 206, the policy installation message sent from the A-RACF to the RCEF may include multiple policies. If an error occurs in the installation of certain policies, the policy install answer message in step 207 will include the names and status of the error policies, but will not specifically show the error reason of each policy failed in installation. That is to say, if an error occurs in installation of certain policies, the policy install answer message will only give a message-level error reason, which is usually expressed with a [Experimental-Result] parameter.

In the prior art, a policy installation condition is expressed with the following parameters in the PIA (Policy Install Answer) message:

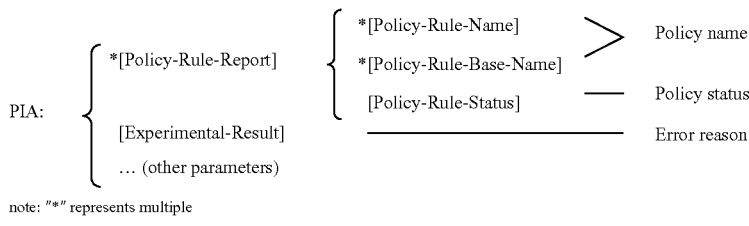

note: "*" represents multiple

In this case, a coarse-grain message-level error reason is returned. This is not favorable for the A-RACF to get the policy installation condition of the RCEF.

SUMMARY

The present disclosure provides a feedback method and a processing system for policy installation failures, which is favorable for an A-RACF to accurately get the detailed information of the policy installation failures in an RCEF, and improves the efficiency of sending the next policy for installation.

In order to solve the above technical problems, the present disclosure provides a feedback method for policy installation failures, including: when the installation of policies sent from an A-RACF to an RCEF is failed, the RCEF generates a feedback message to be sent to the A-RACF, wherein the feedback message includes error reasons of the policy installation failures.

Further, the above method may be characterized in that the feedback message is a PIA message or an event notification (CCR) message.

Further, the above method may be characterized in that during a resource request process or a modification process in PUSH mode, the RCEF installs the policies; if the policy installation is failed, a policy-error-reason parameter is added to the PIA message that is to be sent to the A-RACE over an Re interface, or else the policy-error-reason parameter is not be added.

Further, the above method may be characterized in that during a resource release process, if an error occurs in the policy installation enforced by the RCEF, a policy-error-reason parameter is added to the CCR message that is to be sent to the A-RACF over an Re interface, or else the policy-error-reason parameter is not added.

Further, the above method may be characterized in that the policy error reason is added to a policy-rule-report parameter.

Further, the above method may be characterized in that the policy-rule-report parameter also includes the following parameters: policy name and policy status.

Further, the above method may be characterized in that the policy-rule-report parameter includes a policy error reason and one or more policy names.

Further, the above method may be characterized in that an error reason table is established in the A-RACF and the RCEF, with each error reason corresponding to a reason value; when the installation of policies sent from the A-RACF to the RCEF is failed, reason values of the installation failures are added by the RCEF to the feedback message; after receiving the reason values, the A-RACF gets the error reason of each policy failed in installation by referring to the error reason table.

In order to solve the above technical problems, the present disclosure also provides a processing system for policy installation failures, including an A-RACF and an RCEF, wherein the A-RACF is used for downwardly sending a policy to the RCEF;

the RCEF is used for sending a feedback message to the A-RACF to confirm installation, and if the policy installation is failed, the feedback message includes error reasons of policies failed in installation.

Further, the above system may be characterized in that the feedback message is a PIA message or a CCR message.

If errors occur in multiple policies, only a general error reason is returned to the A-RACF, in this case, the A-RACF cannot specifically tackle each policy. By contrast, through the method of the present disclosure, each policy failed in installation is given an error reason, i.e. a finer-grained policy-level error reason, which helps the A-RACF accurately get the error reason of each policy failed in installation enforced by the RCEF. In this way, when policies are sent for installation next time, they can be specifically tackled, thereby avoiding the same error from occurring again, further, guaranteeing the effectiveness of the next policy installation and improving the efficiency of sending policies for installation next time. This is especially effective when errors occur in the installation of multiple policies.

BRIEF DESCRIPTION OF THE DRAWINGS

FIG. 4 is a flowchart of a resource release process based on the method of the present disclosure.

DETAILED DESCRIPTION

The technical scheme of the present disclosure is described in details as follows, in combination with the attached figures.

The main concept of the present disclosure is that when the installation of policies sent from A-RACF to RCEF is failed, the RCEF will return the error reason of each policy failed in installation to the A-RACF.

The method specifically includes the following steps:

(1) modifying a [Policy-Rule-Report] parameter in a PIA message on an Rw interface, and adding a [Rule-Failure-Code] parameter to this parameter, i.e.,

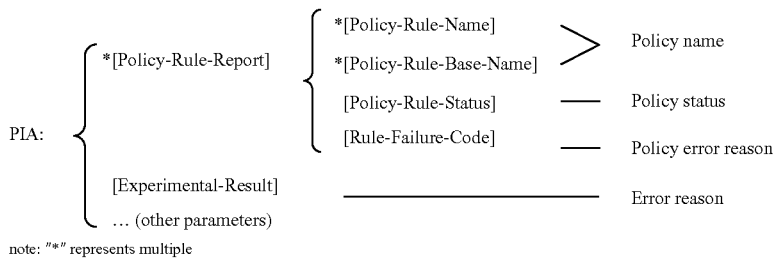

note: "*" represents multiple the [Policy-Rule-Report] parameter in the PIA message feeds back the policy installation condition in the RCEF, wherein the [Policy-Rule-Name] and the [Policy-Rule-Base-Name] represent a policy name, and the [Policy-Rule-Status] represents a policy status; if the installation of a certain policy is failed, the error reason of the error policy, i.e. [Rule-Failure-Code], will also be fed back;

if error reasons of multiple policies failed in installation are the same, the reasons can be reported via one [Policy-Rule-Report], wherein each of such [Policy-Rule-Report] includes one policy error reason and multiple policy names. If error reasons of multiple policies failed in installation are not the same, the reasons can be reported via multiple [Policy-Rule-Report], wherein each [Policy-Rule-Report] includes one policy error reason and one or more corresponding policy names.

(2) modifying a [Policy-Rule-Report] parameter in a CCR message on an Re interface, and adding a [Rule-Failure-Code] parameter to this parameter, i.e.,

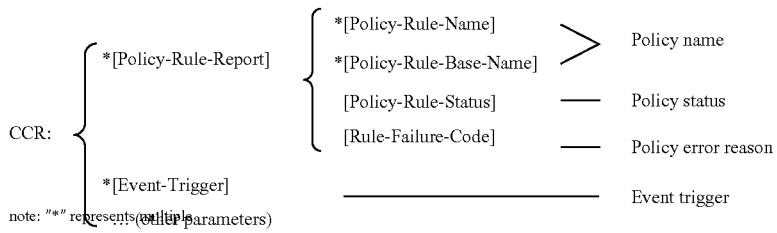

note: "*" represents(multiple parameters)

if error reasons of multiple policies failed in installation are the same, the reasons can be reported via one [Policy-Rule-Report], wherein each of such [Policy-Rule-Report] includes one policy error reason and multiple policy names; if error reasons of multiple policies failed in installation are not the same, the reasons can be reported via multiple [Policy-Rule-Report], wherein each [Policy-Rule-Report] includes one policy error reason and one or more corresponding policy names.

A processing system for policy installation failures based on the present disclosure comprises an A-RACF and an RCEF, wherein the A-RACF is used for sending a policy to the RCEF;

the RCEF is used for sending a feedback message to the A-RACF to confirm installation, and if the policy installation is failed, the feedback message includes error reasons of policies failed in installation.

The feedback message is a PIA message or a CCR message.

Figure 1:
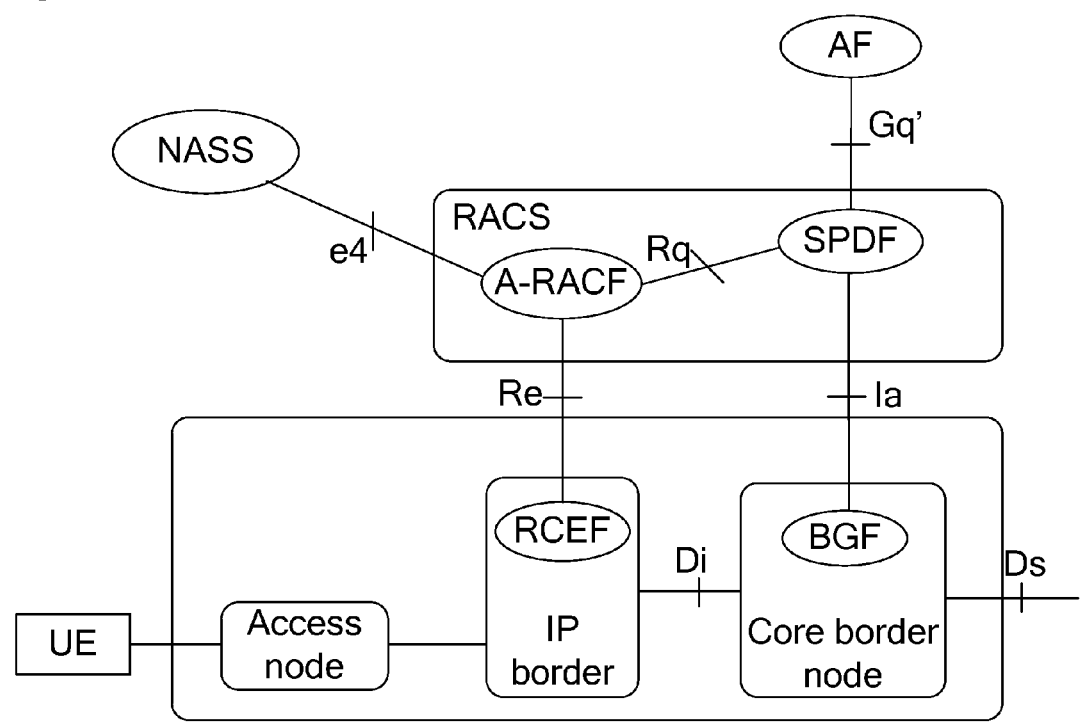
FIG. 1 is a functional framework of RACS in TISPAN in the prior art.
Figure 2:
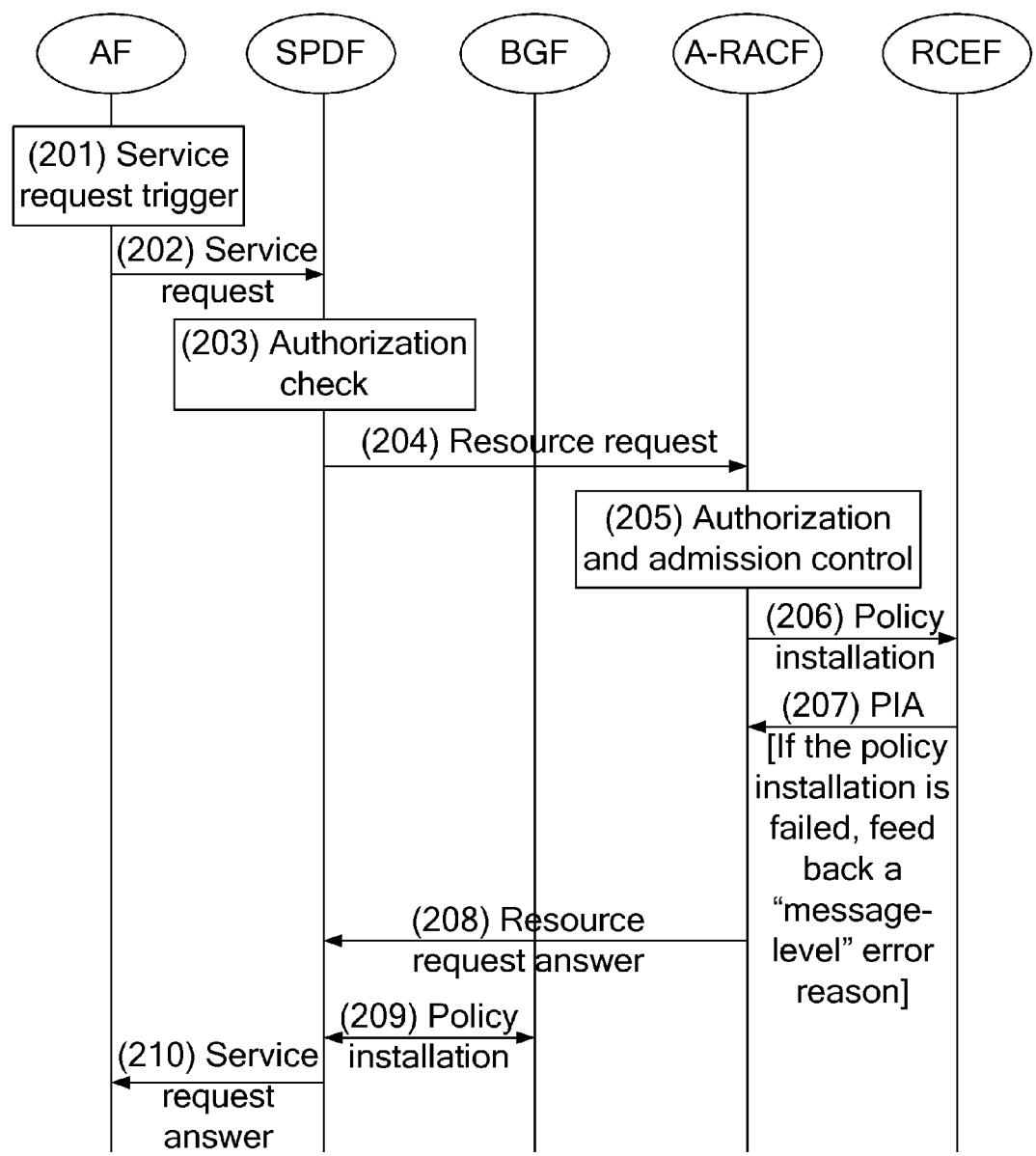
FIG. 2 is a flowchart of a resource request process in PUSH mode in the prior art.
Figure 3:
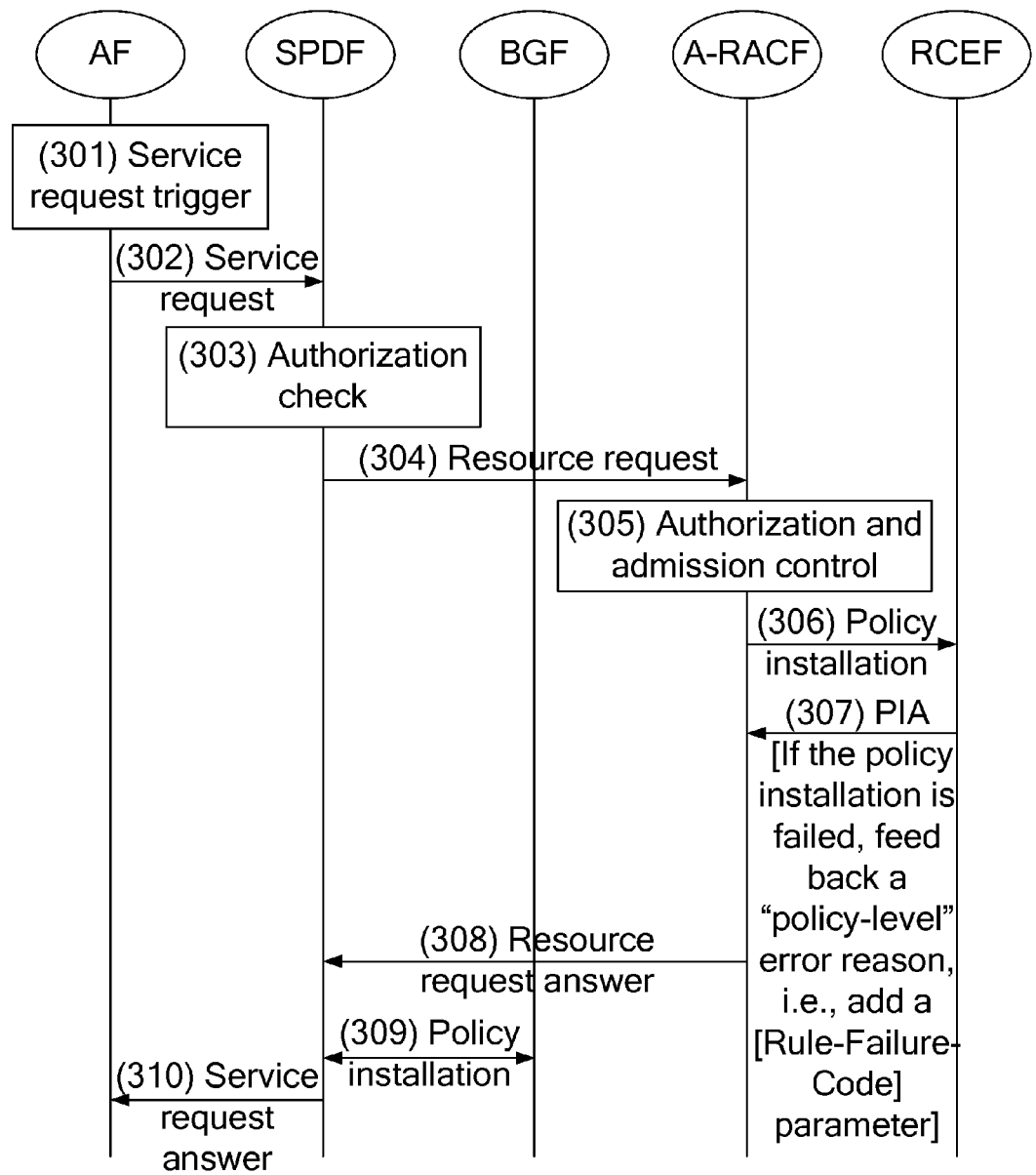
FIG. 3 is a flowchart of a resource request process in PUSH mode based on the method of the present disclosure.

A resource request process in PUSH mode based on the method of the present disclosure, as shown in FIG. 3, includes the following steps:

(301) after receiving a service request from a user, AF is triggered to generate a session initialization request;

(302) the AF sends a service request message to SPDF to request resources so as to meet the user demand;

(303) the SPDF performs an authorization check on the service request according to policies of local operators, i.e., determining whether the requested resources are consistent with the policy rules of the local operators;

(304) if the authorization check is passed, the SPDF sends a resource request message to the A-RACF to request corresponding resources;

(305) the A-RACF performs authorization and admission control according to access network policies, and determines whether it is necessary to load a transmission policy into RCEF;

(306) if the loading is required, the A-RACE interacts with the RCEF and performs transmission policy installation;

(307) the RCEF sends a PIA message to the A-RACF to confirm the installation;

the A-RACF may send multiple polices to the RCEF once; if policy installation failures exist, the installation failure reason of each specific policy failed in installation will be returned.

Specifically, the installation failure reasons can be expressed with a [Rule-Failure-Code] parameter which is included in a [Policy-Rule-Report] parameter, shown as follows:

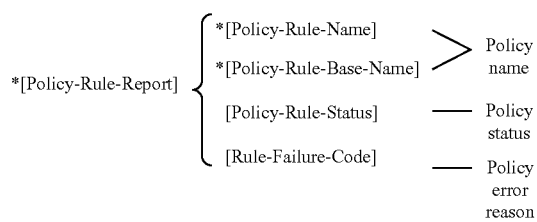

note: "*" represents multiple the [Policy-Rule-Report] parameter in the PIA message is used for feeding back the policy installation condition in the RCEF; after the [Rule-Failure-Code] parameter is added to this parameter, the installation failure reason of each policy failed in installation will be returned;

during concrete realization, for example, an error reason table may be established in the A-RACF and the RCEF in advance, wherein possible error reasons are included in the table and each error reason corresponds to a reason value; when the installation of policies sent from the A-RACF to the RCEF is failed, reason values of the installation failures are reported by the RCEF via the PIA; therefore the A-RACF may get the error reason of each policy failed in installation by referring to the error reason table;

(308) the A-RACF sends a resource request answer to inform the SPDF;

(309) the SPDF sends policies to the BGF, and the BGF installs the policies and informs the SPDF of the result;

step (309) and steps (304)-(308) are not necessarily performed in sequence and may also be performed simultaneously;

(310) the SPDF sends a service request answer to inform the AF.

A resource release process based on the method of the present disclosure, as shown in FIG. 4, includes the following steps:

(401) if an event trigger occurs in the RCEF, it is possible that errors occur in the installation of some policies;

(402) the RCEF sends an event notification message, i.e. a CCR message, to the A-RACF;

if the installation of some policies is failed, then the RCEF will return detailed information to the A-RACF, namely, the installation failure reason of each policy failed in installation will be returned;

specifically, the installation failure reasons may be expressed with a [Rule-Failure-Code] parameter which is included in a [Policy-Rule-Report] parameter, shown as follows:

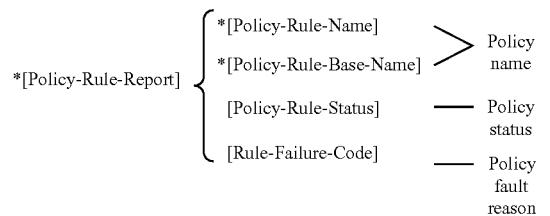

note: "*" represents multiple the [Policy-Rule-Report] parameter in the CCR message is used for feeding back the policy installation condition in the RCEF; after the [Rule-Failure-Code] parameter is added to this parameter, the installation failure reason of each specific policy failed in installation will be returned.

(402a) the A-RACF returns an event notification answer to the RCEF;

(403) the A-RACF sends a session interruption request message to the SPDF;

(403a) the SPDF returns a session interruption request answer to the A-RACF;

(404) the SPDF sends a session interruption request message to the AF;

(404a) the AF replies to the SPDF with a session interruption request answer; and (405) the SPDF releases resources in the BGF.

Step 404 and step 405 are not necessarily performed in sequence.

Besides the above processes, the method of the present disclosure may also be adopted to report failure reasons in other processes of sending policies for installation, e.g., in a modification process, similar to the request process, where a PIR (Policy-Install-Request) command is used to send updated policies, and a PIA command is used to report failure reasons.

Of course, there can also be many other embodiments of the present disclosure. For the skilled in the art, without departing from the spirit and essence of the present disclosure, various changes and modifications can be made according to the present disclosure, which should also be included within the protection scope of the claims attached to the present disclosure.

INDUSTRIAL APPLICABILITY

By using the method of the present disclosure, each policy failed in installation is given an error reason, i.e., a finer-grain policy-level error reason, which helps A-RACF get accurate error reason of each policy failed in installation enforced by RCEF. In this way, when policies are sent for installation next time, they can be specifically tackled by the A-RACF, thus avoiding the same error from occurring again, further, guaranteeing the effectiveness of the next policy installation and improving the efficiency of sending policies for installation next time. This is especially effective when errors occur in the installation of multiple policies.

What is claimed is:

1. A feedback method for policy installation failures, comprising:
when the installation of policies sent from an A-RACF (Access-Resource and Admission Control Function) to an RCEF (Resource Control Enforcement Function) is failed, the RCEF generating a feedback message to be sent to the A-RACF,
wherein a policy error reason for each policy installation failure is included in the feedback message, and the policy error reason is included in a policy-rule-report parameter,
wherein error reasons of multiple-policy installation failure which are the same are reported via one policy-rule-report parameter, each of the policy-rule-report parameters includes one policy error reason and multiple policy names; and error reasons of multiple-policy installation failure which are not the same are reported via multiple policy-rule-report parameters, each of the policy-rule-report parameters includes one policy error reason and one or more corresponding policy names.

2. The method according to claim 1, wherein the feedback message is a PIA (Policy Install Answer) message or a CCR (event notification) message.

3. The method according to claim 2, wherein during a resource request process or a modification process in PUSH mode, the RCEF installs the policies; if the policy installation is failed, then a policy-error-reason parameter is added to the PIA message that is to be sent to the A-RACF over an Re interface, or else the policy-error-reason parameter is not added.

4. The method according to claim 2, wherein during a resource release process, if an error occurs in the policy installation enforced by the RCEF, a policy-error-reason parameter is added to the CCR message that is to be sent to the A-RACF over an Re interface, or else the policy-error-reason parameter is not added.

5. The method according to claim 1, wherein the policy-rule-report parameter also includes the following parameters: policy name and policy status.

6. The method according to claim 1, wherein
an error reason table is established in the A-RACF and the RCEF, with each error reason corresponding to a reason value;
when the installation of policies sent from the A-RACF to the RCEF is failed, reason values of the installation failures are added by the RCEF to the feedback message;
after receiving the reason values, the A-RACF gets the error reason of each policy failed in installation by referring to the error reason table.

7. The method according to claim 2, wherein
an error reason table is established in the A-RACF and the RCEF, with each error reason corresponding to a reason value;
when the installation of policies sent from the A-RACF to the RCEF is failed, reason values of the installation failures are added by the RCEF to the feedback message;
after receiving the reason values, the A-RACF gets the error reason of each policy failed in installation by referring to the error reason table.

8. The method according to claim 3, wherein
an error reason table is established in the A-RACF and the RCEF, with each error reason corresponding to a reason value;
when the installation of policies sent from the A-RACF to the RCEF is failed, reason values of the installation failures are added by the RCEF to the feedback message;
after receiving the reason values, the A-RACF gets the error reason of each policy failed in installation by referring to the error reason table.

9. The method according to claim 4, wherein
an error reason table is established in the A-RACF and the RCEF, with each error reason corresponding to a reason value;
when the installation of policies sent from the A-RACF to the RCEF is failed, reason values of the installation failures are added by the RCEF to the feedback message;
after receiving the reason values, the A-RACF gets the error reason of each policy failed in installation by referring to the error reason table.

10. A processing system for policy installation failures, comprising:
an A-RACF (Access-Resource and Admission Control Function) for sending a policy to an RCEF (Resource Control Enforcement Function); and
an RCEF for sending a feedback message to the A-RACF to confirm installation,
wherein the feedback message includes a policy installation failure if the policy installation is failed, and the policy error reason is included in a policy-rule-report parameter,
wherein error reasons of multiple-policy installation failure which are the same are reported via one policy-rule-report parameter, each of the policy-rule-report parameters includes one policy error reason and multiple policy names; and error reasons of multiple-policy installation failure which are not the same are reported via multiple policy-rule-report parameters, each of the policy-rule-report parameters includes one policy error reason and one or more corresponding policy names.

11. The system according to claim 10, wherein the feedback message is a PIA (Policy Install Answer) message or a CCR (event notification) message.

* * * * *

UNITED STATES PATENT AND TRADEMARK OFFICE
CERTIFICATE OF CORRECTION

PATENT NO. : 8,713,164 B2  Page 1 of 1
APPLICATION NO. : 13/056776
DATED : April 29, 2014
INVENTOR(S) : You et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 326 days.

Signed and Sealed this

Twenty-ninth Day of September, 2015

Michelle K. Lee
*Director of the United States Patent and Trademark Office*